Patented Mar. 24, 1942

2,277,636

UNITED STATES PATENT OFFICE 2,277,636

SECONDARY OR STORAGE BATTERY

James Joseph Drumm and Albert George Burnell, Inchicore, Dublin, Irish Free State, assignors to Drumm Battery Company Limited, Inchicore, Dublin, Irish Free State No Drawing. Application June 28, 1937, Serial No. 150,884. In Great Britain April 6, 1937

2 Claims. (Cl. 136—29)

This invention relates to electric accumulators or secondary or storage batteries.

In the specification of our prior British Patent No. 365,125 we have claimed an alkaline accumulator which has now come to be known as the "Drumm battery" and in which there is a positive electrode comprising a depolariser consisting of nickelic oxide and/or silver oxide with or without admixture of graphite and/or nickel flake, an alkaline electrolyte consisting of a solution of zinc oxide in caustic alkali and a negative electrode having a smooth clean surface of nickel.

In British specification No. 394,671 we have claimed a nickel electrode annealed in an atmosphere of hydrogen.

Experience has shown that certain improvements can be effected in the constitution and mode of treatment of the negative electrode in order to reduce the rate of self-discharge of the battery, and the present invention consists in certain developments or modifications of the invention covered by British Patent No. 365,125 whereby the rate of self-discharge can be reduced.

According to the present invention we make our negative plates of nickel of an order of purity hereinafter specified and subject the same to an annealing process in an atmosphere of hydrogen at 1250° C.

In carrying our invention into effect we make the negative plates of our battery of pure nickel metal of the following order of purity.

| | Per cent | |
|---|---|---|
| Nickel | 99.4 | minimum |
| Cobalt | 0.5 | maximum |
| Iron | 0.1 | maximum |
| Copper | 0.02 | maximum |
| Carbon | 0.02 | maximum |
| Silicon | 0.02 | maximum |
| Sulphur | 0.001 | maximum |
| Oxygen | 0.001 | maximum |

Magnesium manganese—none allowable.

The plate is preferably made up in boat form of which an example is described in British Patent specification No. 407,074 and the micro structure of a transverse section of any of the components should reveal a material of homogeneous structure without any traces of a second phase such as makes its appearance in nickel at the crystal boundaries as intercrystalline filaments or bands or as isolated inclusions if oxygen or sulphur compounds are present or excess carbides or silicon compounds (slag inclusions).

The crystal texture should be uniform and the crystal boundaries revealed by hair lines only.

In the practical manufacture of such optimum negative plate material it is not practicable to have the chemical and metallographical requirements fully satisfied without a final annealing process in an atmosphere of pure dry hydrogen gas at a temperature of 1250° C., and our invention therefore extends to such an annealing process which removes the last traces of oxygen (provided excess $SiO_2$ was not present in the original material) and sulphur compounds from the material. Furthermore at 1250° C. nickel recrystallises sufficiently readily to yield a plate of homogeneous crystal structure. The annealing operation should be continued for a period sufficiently long to give the desired structure and in general we have found one hour satisfactory.

We claim:

1. A process of forming a negative electrode for an alkaline electric accumulator of the kind referred to which consists in preparing a nickel plate free from manganese and magnesium and containing at least 99.4% nickel, not more than 0.5% cobalt, not more than 0.1% iron, not more than 0.02% copper, not more than 0.02% carbon and not more than 0.02% silicon, and subjecting the said plate to an annealing in a hydrogen atmosphere at a temperature of at least 1250° C. whereby to remove oxygen and sulphur and give the plate a homogeneous crystal structure.

2. A negative electrode for an alkaline electric accumulator of the kind described formed of nickel of a homogeneous crystal structure, substantially free from manganese, magnesium, oxygen and sulphur and containing at least 99.4% nickel, not more than 0.5% cobalt, not more than 0.1% iron, not more than 0.02% copper, not more than 0.02% carbon and not more than 0.02% silicon; said electrode having the characteristic properties and crystal structure produced by heating the same in an atmosphere of hydrogen at a temperature of at least 1250° C.

JAMES JOSEPH DRUMM.
ALBERT GEORGE BURNELL.